United States Patent
Ishigaki

[19]

[11] Patent Number: 5,848,608
[45] Date of Patent: *Dec. 15, 1998

[54] VACUUM-PRESSURE-CONTROL SLOW EXHAUST VALVE

[75] Inventor: Tsuneo Ishigaki, Yawara-mura, Japan

[73] Assignee: SMC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 740,561

[22] Filed: Oct. 30, 1996

[30] Foreign Application Priority Data

Nov. 14, 1995  [JP]  Japan .................................... 7-319501

[51] Int. Cl.⁶ ................................................. F16K 31/122
[52] U.S. Cl. .................. 137/599.2; 137/630; 137/637.2; 251/60
[58] Field of Search ................................ 137/599.2, 630, 137/637.2; 251/60

[56] References Cited

U.S. PATENT DOCUMENTS 4,041,979  8/1977  Grotloh ............................ 137/637.2 X
4,561,464  12/1985  Frantz ................................ 137/596.18
5,172,722  12/1992  Nishimura ............................ 137/630 X

OTHER PUBLICATIONS

Japanese Abstract JPA–8–166085, Jun. 25, 1996 with English Abstract, Published Jun. 25, 1996.

*Primary Examiner*—Gerald A. Michalsky
*Attorney, Agent, or Firm*—Oblon, Spivak, McClelland, Maier & Neustadt, P.C.

[57] ABSTRACT

To reduce the axial length of a slow exhaust valve and thus the size of the valve, a secondary valve seat and a secondary valve body constituting a secondary valve mechanism for restrictively opening a channel connecting a chamber port and a pump port during the first half of the exhaust process in order to limit the exhaust speed are incorporated in a primary valve body in a primary valve mechanism; a secondary-valve-body drive mechanism and a pressure-acting secondary chamber are incorporated inside a primary-valve-body drive member in the primary valve mechanism; and a secondary shaft that connects the secondary valve body and the secondary-valve-body drive member together is disposed inside a primary shaft.

5 Claims, 4 Drawing Sheets

VACUUM-PRESSURE-CONTROL SLOW EXHAUST VALVE

BACKGROUND OF THE INVENTION

1. Field of the Invention

The present invention relates to a vacuum pressure control valve that is connected between a vacuum chamber and a vacuum pump in order to create a vacuum in the chamber, and in particular, to a slow exhaust valve having a slowly exhaust function for slowly exhausting the gas in the chamber.

2. Description of the Prior Art

In general, if the internal pressure of a vacuum chamber is reduced to a vacuum and the gas in the chamber maintained at a high pressure (at or near the atmospheric pressure) is exhausted abruptly, a large amount of gas flows at once to cause a turbulent flow within the vacuum chamber, thereby stirring up dust adhering to the inner wall of the chamber. This affects subsequent operations and causes the vacuum pump to be overloaded.

Thus, it has been proposed that a vacuum control valve connected between the vacuum chamber and the vacuum pump be configured as a slow exhaust valve that has a primary valve mechanism with a large opening and a secondary valve mechanism with a small opening and which restrictively opens the channel between the vacuum chamber and the vacuum pump via the secondary valve mechanism during initial exhaust in order to carry out exhaust at a slow speed while opening the channel widely via the primary valve mechanism when the pressure in the vacuum chamber becomes sufficiently low.

Since, however, a primary valve drive member such as a piston for opening and closing the primary valve mechanism and a similar secondary valve drive member for opening and closing the secondary valve mechanism are serially incorporated in such a slow exhaust valve at axially different positions within the valve body and have different stroke ranges, the axial length of the valve must be increased accordingly, so the size of the valve cannot be reduced. A valve body is required that has a dedicated structure such that it incorporates both the primary and the secondary valve drive mechanisms, and the structure of said valve body must differ depending or whether it includes a secondary valve mechanism.

BRIEF SUMMARY OF THE INVENTION

A main objective of this invention is to reduce the axial length of a slow exhaust valve including a primary and a secondary valve mechanisms as described above in order to reduce the size of the valve.

Another objective of this invention is to provide a slow exhaust valve that includes a secondary valve mechanism but can use a valve body commonly used in slow exhaust valves that do not include a secondary valve mechanism.

Yet another objective of this invention is to provide a slow exhaust valve in which the secondary valve mechanism is incorporated into the primary valve mechanism to provide a simple structure and assembly as well as stable operations.

To achieve the above objectives, this invention provides a vacuum-pressure-control slow exhaust valve comprising a chamber port that is connected to a vacuum port, a pump port that is connected to a vacuum port, a primary valve mechanism that fully opens and closes a channel connecting both ports, and a secondary valve mechanism that restrictively opens and closes the channel connecting both ports, the primary valve mechanism having a primary valve seat disposed in the channel connecting both ports, a primary valve body that opens and closes the primary valve seat, a primary-valve-body drive member that uses fluid pressure to drive the primary valve body, and a primary shaft that connects the primary valve body and the primary-valve-body drive member together, a secondary valve mechanism having a secondary valve seat with a smaller opening area than the primary valve seat, a secondary valve body that opens and closes the secondary valve seat, a secondary-valve-body drive member that uses fluid pressure to drive the secondary valve body, and a secondary shaft that connects the secondary valve body and the secondary-valve-body drive member, wherein the secondary valve seat and the secondary valve body are incorporated into the primary valve body, wherein the secondary-valve-body drive member and a pressure-acting secondary chamber for allowing fluid pressure to act on the secondary-valve-body drive member are incorporated inside the primary-valve-body drive member, and wherein the secondary shaft penetrates the inside of the primary shaft.

Since the secondary-valve-body drive member and the pressure-acting secondary chamber are disposed inside the primary-valve-body drive member as described above, the axial length of the valve body and thus the size of the valve can be reduced compared to conventional techniques, wherein such parts are linearly disposed and operated in different positions.

In addition, the incorporation of the secondary valve mechanism into the primary valve mechanism enables the secondary valve mechanism to be installed simultaneously with the primary valve mechanism simply by installing the primary valve mechanism in the valve body, thus eliminating the need to machine the valve body so as to accommodate the installation of the secondary valve mechanism. This configuration serves to provide a very simple valve structure and assembly, high assembly precision, and stable operations, and further enables the valve body to be commonly used in slow exhaust valves that do not have a secondary valve mechanism.

According to a specific configuration of this invention, the pressure-acting secondary chamber and a secondary operation port that is opened in the valve body communicate with each other via a passage hole passing from the valve body through the primary shaft and opening into the pressure-acting secondary chamber.

The secondary valve body is preferably a needle valve.

According to this invention, the slow exhaust valve includes an opening-adjustment mechanism that enables the external adjustment of the opening of the secondary valve mechanism.

According to the preferred configuration of this invention, the opening-adjustment mechanism has an adjustment screw that defines the opening stroke end of the secondary-valve-body drive member and an operation member for adjusting the position of the adjustment screw. The adjustment screw is attached to the primary-valve-body drive member so as to move up and down when rotated, and the operation member is mounted on the valve body in such a way that it can be externally rotated and is fitted to the adjustment screw in such manner that it engages the screw in the rotational direction while they can move relative to each other in the axial direction.

DETAILED DESCRIPTION OF THE PREFERRED EMBODIMENT

Figure 1:
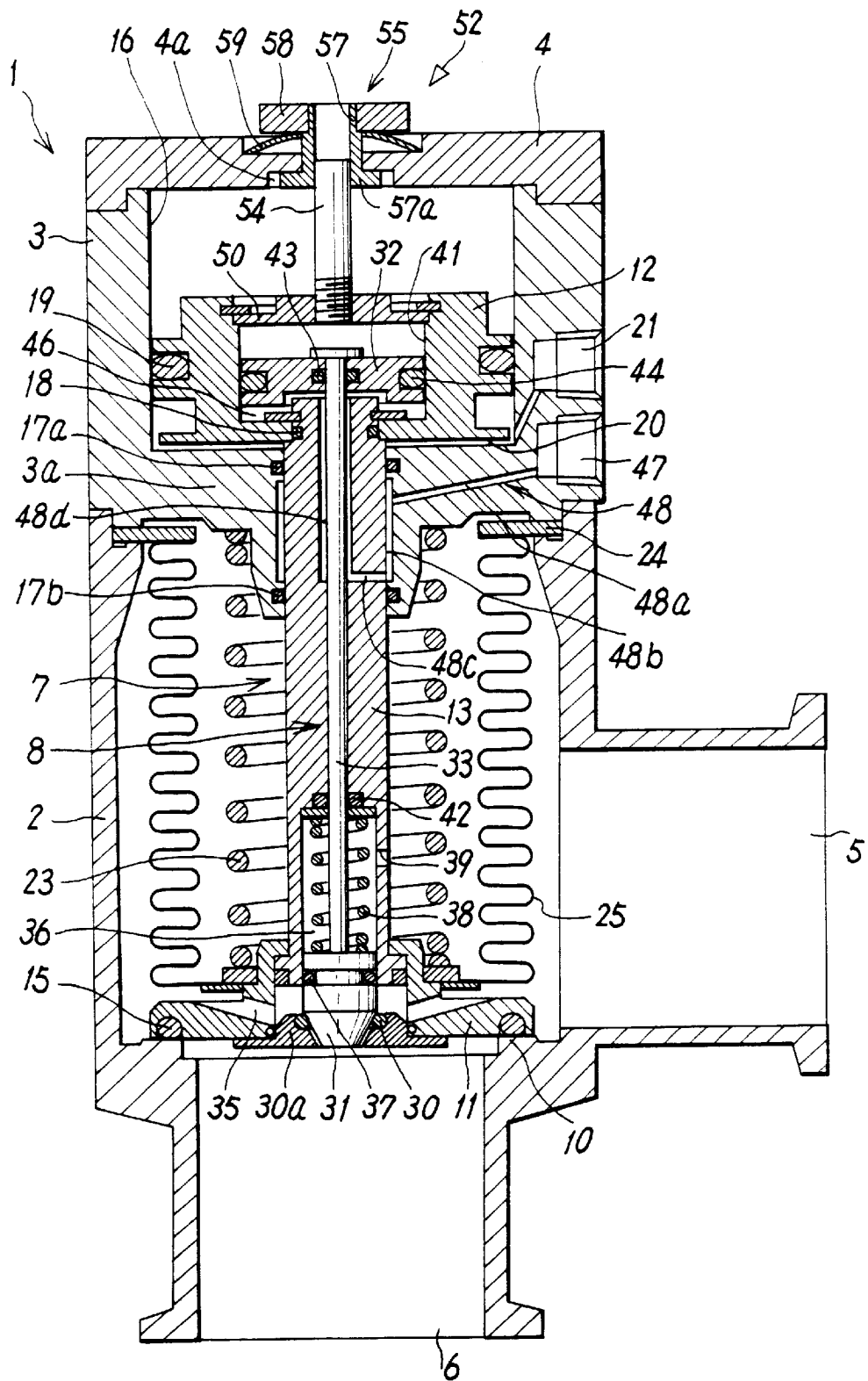
FIG. 1 is a vertical cross sectional view showing one embodiment of a slow exhaust valve according to this invention, wherein the primary and secondary valve mechanisms are both closed.

FIG. 1 shows one embodiment of a slow exhaust valve according to this invention. The valve according to this invention has a valve body 1 comprising a first body member 2 and a second body member 3. The first and the second body members 2, 3 are disposed in the axial direction of the valve in such a manner that the inside of these body members are partitioned by the bulkhead portion 3a of the second body member 3. These body members are coupled together by bolts or some other coupling means.

The first body member 2 has a chamber port 5 that is connected to a vacuum chamber and a pump port 6 that is connected to a vacuum pump, and the valve body 1 has inside a primary valve mechanism 7 that fully opens and closes a channel connecting the ports 5, 6 and a secondary valve mechanism 8 that restrictively opens and closes the channel connecting the ports 5, 6.

The primary valve mechanism 7 has a primary valve body 11 that opens and closes a primary valve seat 10 in the channel connecting the ports 5, 6, a primary-valve-body drive member 12 that uses fluid pressure to drive the primary valve body 11, and a primary shaft 13 that connects the primary valve body 11 and the primary-valve-body drive member 12.

The primary valve body 11 has on the outer circumference of its bottom surface a seal member 15 made of synthetic rubber for closing the primary valve seat 10, and is mounted at the bottom end of the primary shaft 13 with a certain degree of freedom in order to ensure the sealing of the primary valve seat 10.

The top end of the primary shaft 13 slidably penetrates the bulkhead portion 3a of the second body member 3 in an airtight manner to protrude into a primary drive chamber 16 inside the second body member 3, and is connected to the primary-valve-body drive member 12 disposed in the primary drive chamber 16 in an airtight manner. Reference numerals 17a, 17b designate seal members that maintain the air tightness between the primary shaft 13 and the bulkhead section 3a, and 18 is a seal member that maintains the air tightness between the primary shaft 13 and the primary-valve-body drive member 12.

Figure 3:
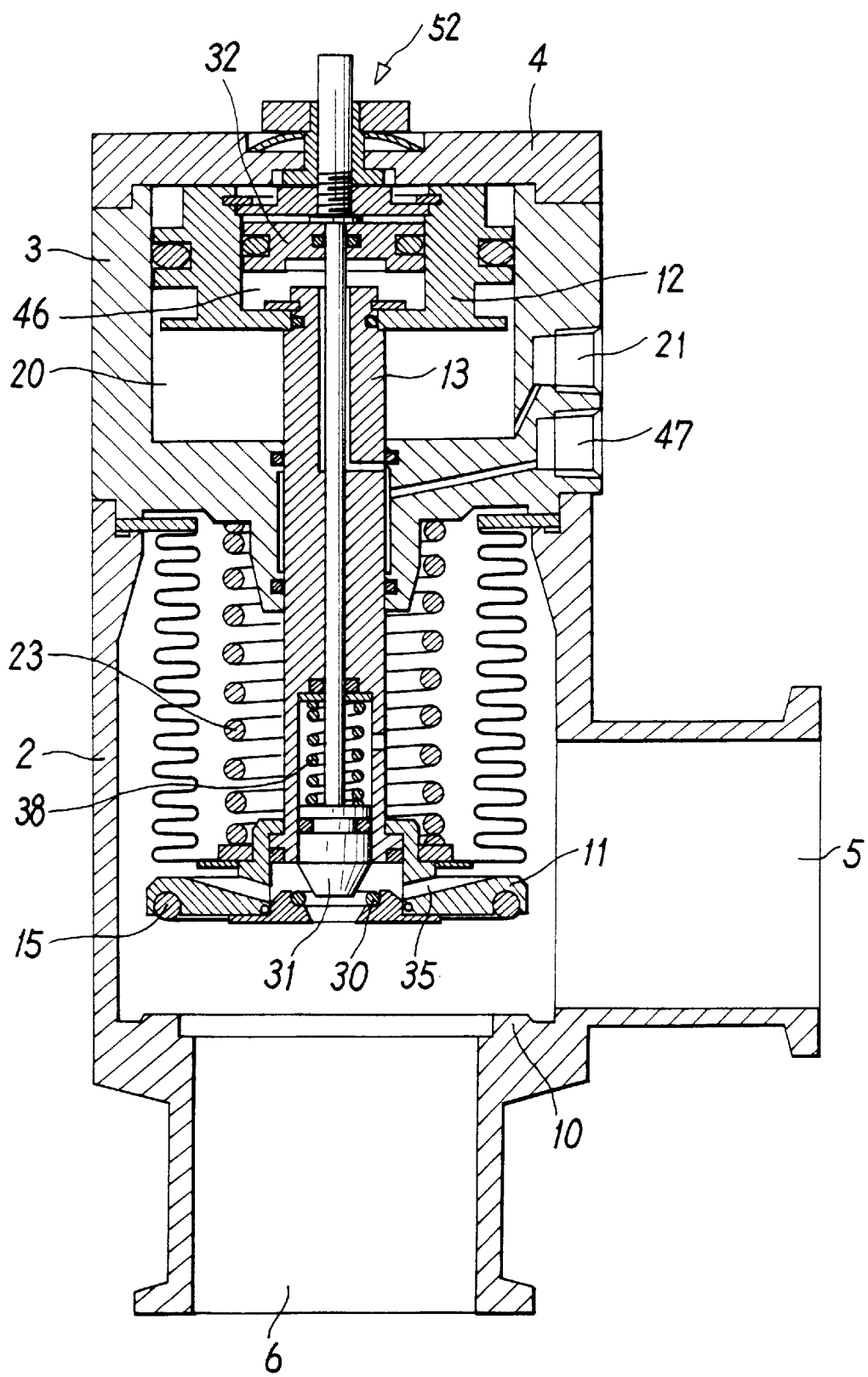
FIG. 3 is a vertical cross sectional view showing the slow exhaust valve in FIG. 1, wherein the primary and the secondary valve mechanisms are open.

The primary-valve-body drive member 12 comprises a piston that can slide within the primary drive chamber 16, and has on its outer circumference a seal member 19 that slidably contacts the inner wall of the primary drive chamber 16 in an airtight manner. When a pressurized fluid such as compressed air is supplied from a primary operation port 21 opened on the side of the second body member 3 to a pressure-acting primary chamber 20 partitioned and formed between the primary-valve-body drive member 12 and the bulkhead portion 3a, the primary-valve-body drive member 12 is elevated as shown in FIG. 3 to cause the main valve body 11 to open the primary valve seat 10.

Inside the first body member 2, a return spring 23 that pushes the primary valve body in the closing direction is compressed between the primary valve body 11 and the bulkhead portion 3a, and a bellows 25 encasing the primary shaft 13 and the return spring 23 is disposed between the primary valve body 11 and a plate 24 gripped between the body members 2, 3.

On the other hand, the secondary valve mechanism 8 comprises a secondary valve seat 30 having a smaller opening area than the primary valve seat 10, a secondary valve body 31 that opens and closes the secondary valve seat 30 having a smaller opening area than the primary valve seat 10, a secondary valve body 31 that opens and closes the secondary valve seat 30, a secondary-valve-body drive member 32 that uses fluid pressure to drive the secondary valve body 31, and a secondary shaft 33 connecting the secondary valve body 31 and the secondary-valve-body drive member 32. These components are completely built into the primary valve mechanism 7.

The primary valve body 11 has detachably attached thereto a secondary valve body 30a with a vent hole in the center, around which the secondary valve seat 30 comprising a seal member and a channel 35 allowing the secondary valve seat 30 to communicate with the chamber port 5 are formed. A valve chamber 36 is formed at the bottom end of the primary shaft 13, the secondary valve body 31 comprising a needle valve is disposed inside the valve chamber 36 in such a way that it can slide via a seal member 37 in an airtight manner, and a return spring 38 that pushes the secondary valve body 31 in the valve-closing direction is also disposed inside the valve chamber. In the figure, 39 is a breather hole for the rear chamber of the secondary valve body 31 in which the return spring 38 is disposed.

The top end of the secondary shaft 33 slidably penetrates the inside of the primary shaft 13 in an airtight manner to protrude into a secondary drive chamber 41 inside the primary-valve-body drive member 12, and is connected in an airtight manner to the secondary-valve-body drive member 32 disposed inside the secondary drive chamber 41. In the figure, 42 is a seal member that maintains the airtightness between the secondary shaft 33 and the primary shaft 13, and 43 is a seal member that maintains the airtightness between the secondary shaft 33 and the secondary-valve-body drive member 32.

The secondary-valve-body drive member 32 comprises a piston that can slide within the secondary drive chamber 41, and has on its outer circumference a seal member 44 that slidably contacts the inner wall of the secondary drive chamber 41 in an airtight manner. A pressure-acting secondary chamber 46 is partitioned and formed between the secondary-valve-body drive member 32 and the primary-valve-body drive member 12, and is in communication via a passage hole 48 with a secondary operation port 47 opened in the side of the second body member 3. The passage hole 48 comprises a hole portion 48a penetrating the second body member 3, a gap 48a formed between the seal members 17a, 17b and between the second body member 3 and the outer surface of the primary shaft 13, a hole portion 48c disposed in the primary shaft 13, and a gap 48d between the primary shaft 13 and the secondary shaft 33.

Figure 2:
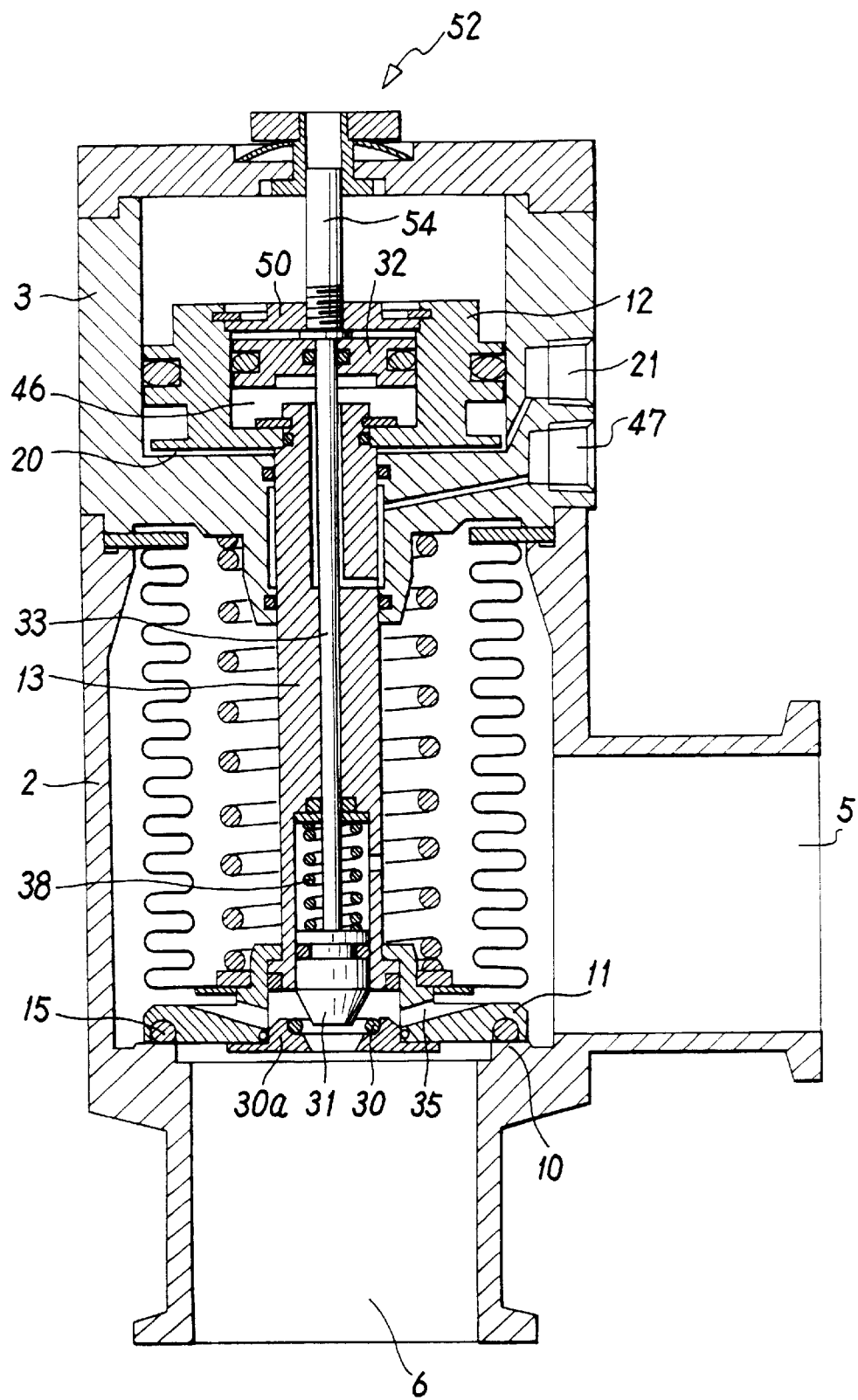
FIG. 2 is a vertical cross sectional view showing the slow exhaust valve in FIG. 1, wherein the secondary valve mechanism is open.

When a pressurized fluid such as compressed air is supplied to the pressure-acting secondary chamber 46 through the passage hole 48, the secondary-valve-body drive member 32 is elevated to a position in which it abuts an adjustment screw 54 fixed at the top end of the pressure-acting secondary chamber 46, thereby causing the secondary valve body 31 to open the secondary valve seat 30, as shown in FIG. 2.

Since the secondary-valve-body drive member 32 and the pressure-acting secondary chamber 46 are incorporated inside the primary-valve-body drive member, the axial length of the valve body 1 and thus the size of the valve can be reduced compared to conventional techniques, wherein the primary-valve-body drive member 12 and the secondary valve body drive member 32 are linearly disposed and operated in different positions.

In addition, the full incorporation of the secondary valve mechanism 8 in the primary valve mechanism 7 enables the secondary valve mechanism 8 to be installed simultaneously with the primary valve mechanism 7 simply by installing the primary valve mechanism 7 in the valve body 1, thereby providing a very simple valve structure and assembly, high assembly precision, and stable operations. The valve body 1 need not be machined so as to accommodate the installation of the secondary valve mechanism 8. As a result, the valve body 1 can be machined easily and commonly used in slow exhaust valves that do not have a secondary valve mechanism.

Furthermore, the relative locational relationship between the primary valve mechanism 7 and the secondary valve mechanism 8 is always constant, and the opening and closing stroke of the secondary valve body 31 is not affected by the position of the primary valve mechanism 7. Thus, even if, for example, the amount of compression for the seal member 15 varies to cause slight vertical changes in the position of the primary valve body 11, the secondary valve body 31 can always maintain a constant distance from the secondary valve seat 30 as well as a constant opening and closing stroke relative to the secondary valve seat 30, thereby preventing malfunctions.

In addition, only the axial force with which the displacement of the secondary-valve-body drive member 32 is transmitted to the secondary valve body 31 acts on the secondary shaft 33, and there is no other excess force acting. This enables the size of the secondary shaft 33 and thus of the valve to be reduced.

The valve also includes an opening-adjustment mechanism 52 that enables the external adjustment of the opening of the secondary valve mechanism 8.

The opening-adjustment mechanism 52 comprises an adjustment screw 54 that defines the opening stroke end of the secondary-valve-body drive member 32, and an operation member 55 for adjusting the position of the adjustment screw 54. The adjustment screw 54 is screwed into the stopper 50 so as to move up and down when rotated. The operation member 55 comprises a cylindrical portion 57 attached to the bonnet 4 of the valve body 1 so as to move vertically and rotationally, a control 58 that is integrally coupled to the top end of the cylindrical portion 57 and which can be rotated outside the bonnet 4, and a spring member 59 that elastically urges the operation member 55 in the direction in which the control 58 protrudes to the outside of the bonnet 4. The adjustment screw 54 is inserted into the cylindrical portion 57 in such a way that they engage each other in the direction of rotation while they move relative to each other in the axial direction.

Methods for coupling the cylindrical portion 57 with the adjustment screw 54 of the operation member 55 include forming the adjustment screw 54 and the cylindrical portion 57 as a square shaft and a square hole, a round shaft (on which one of the sides is made planar) and a round hole, or a shaft and a hole which have an appropriate cross section and include a groove and a protrusion that are only engaged with each other in the direction of rotation. Other appropriate coupling mechanisms may be used.

A flange-like enlarged diameter portion 57a is formed at the bottom end of the cylindrical portion 57, whereas a recess 4a in which the enlarged diameter portion 57a is fitted is formed in the bottom surface of the bonnet 4. A locking mechanism for preventing the operation member 55 from unnecessarily rotating unless the opening is adjusted is installed between the larger diameter portion 57a and the recess 4a.

The configuration of the locking mechanism is arbitrary, but preferable configuration methods include, for example, increasing the friction coefficient of the abutting surface between the larger diameter portion 57a and the recess 4a and providing a plurality of grooves and protrusions that are engaged with each other on the outer circumference of the large diameter portion 57a and the inner circumference of the recess 4a. If grooves and protrusions are provided, finer adjustment of the opening can be executed by increasing their number.

With the opening-adjustment mechanism 52, the opening of the secondary valve body 31 can be adjusted by pushing the operation member 55 upward against the force of the spring member 59 until it leaves the recess 4a to release the locking mechanism, then rotating the operation member 55 to move the adjustment screw 54 up or down relative to the secondary-valve-body drive member 32 in order to change the position of the opening stroke end of the secondary-valve-body drive member 32.

The adjustment screw 54 slides vertically within the operation member 55 according to the displacement of the primary-valve-body drive member 12. However, by setting the sizing relationship between the adjustment screw 54 and the operation member 55 so that the end of the adjustment screw 54 does not protrude outward from the operation member 55 even when the primary-valve-body drive member 12 moves up to the opening stroke end, the valve can be safely and reliably operated even if any other member is located close to the valve.

Next, the operation of the slow exhaust valve having the above configuration is described. FIG. 1 shows the condition prior to the exhausting of the vacuum chamber. In this condition, the primary valve mechanism 7 and the secondary valve mechanism 8 both close the channel, so the operation of the vacuum pump does not cause gas to be discharged from the chamber port 5 to the pump port 6.

When a pressurized fluid is supplied from the secondary operation port 47 through the channel 48 to the inside of the pressure-acting secondary chamber 46, the secondary-valve-body drive member 32 is elevated to a position in which it abuts the adjustment screw 54, thereby pulling up the secondary shaft 33 and the secondary valve body 31 against the force of the return spring 38 to open the secondary valve seat 30. Gas from the chamber port 5 gradually flows to the pump port 6 through the secondary valve seat 30 that is restrictively opened, and the chamber is slowly exhausted.

This prevents the turbulent gas flow that occurs during rapid exhaust of the chamber as well as the stirring up of dust associated with such turbulent flow. It also prevents the vacuum pump from becoming overloaded due to temporary suction of a large amount of air.

Once the pressure inside the chamber has sufficiently decreased to a value at which said turbulent air flow that stirs up dust does not occur, a pressurized fluid is supplied from the primary operation port 21 to the inside of the pressure-acting primary chamber 20 and the primary-valve-body drive member 12 moves upward to a position in which the primary-valve-body drive member 12 abuts the bonnet 4, thereby pulling up the primary shaft 13 and the primary valve body 11, as shown in FIG. 3. Thus, the primary valve seat 10 is fully opened to carry out the rest of the exhaust. At this point, the density of air is low, so no turbulent flow occurs even if air is exhausted rapidly, thereby preventing dust from being stirred up. Of course, the vacuum pump is also prevented from being overloaded.

Once the vacuum chamber has been set at the desired vacuum, a pressurized fluid inside the primary and the pressure-acting secondary chamber 20 and 46 is discharged from the primary and the secondary operation ports 21 and 47, respectively. The primary-valve-body drive member 12 and the secondary-valve-body drive member 32 are returned to the lowered position under the force of the return springs 23 and 38, respectively, so the primary and the secondary valve bodies 11 and 31 close the primary and the secondary valve seats 10 and 30, respectively.

The pressurized fluid inside the pressure-acting secondary chamber 46 may be discharged to close the secondary valve body 31 once the primary valve body 11 has been opened.

A control means (not shown) is used to automatically supply and discharge a pressurized fluid from and to the primary and the pressure-acting secondary chambers 20 and 46 via the primary and the secondary operation ports 21 and 47.

Although in the above embodiment, the primary and secondary-valve-body drive members 12 and 32 are both configured as pistons that slide within the drive chamber, one or both of them may be constituted as a diaphragm type that is supported by a diaphragm so as to be displaced.

In addition, the seal member 17b sealing between the primary shaft 13 and the bulkhead portion 3a may have the function of sealing the vacuum pressure from the chamber port 5 in order to omit the bellows 25. In this case, a vacuum pressure seal is of course applied to the connection between the first body member 2 and the second body member 3.

Figure 4:
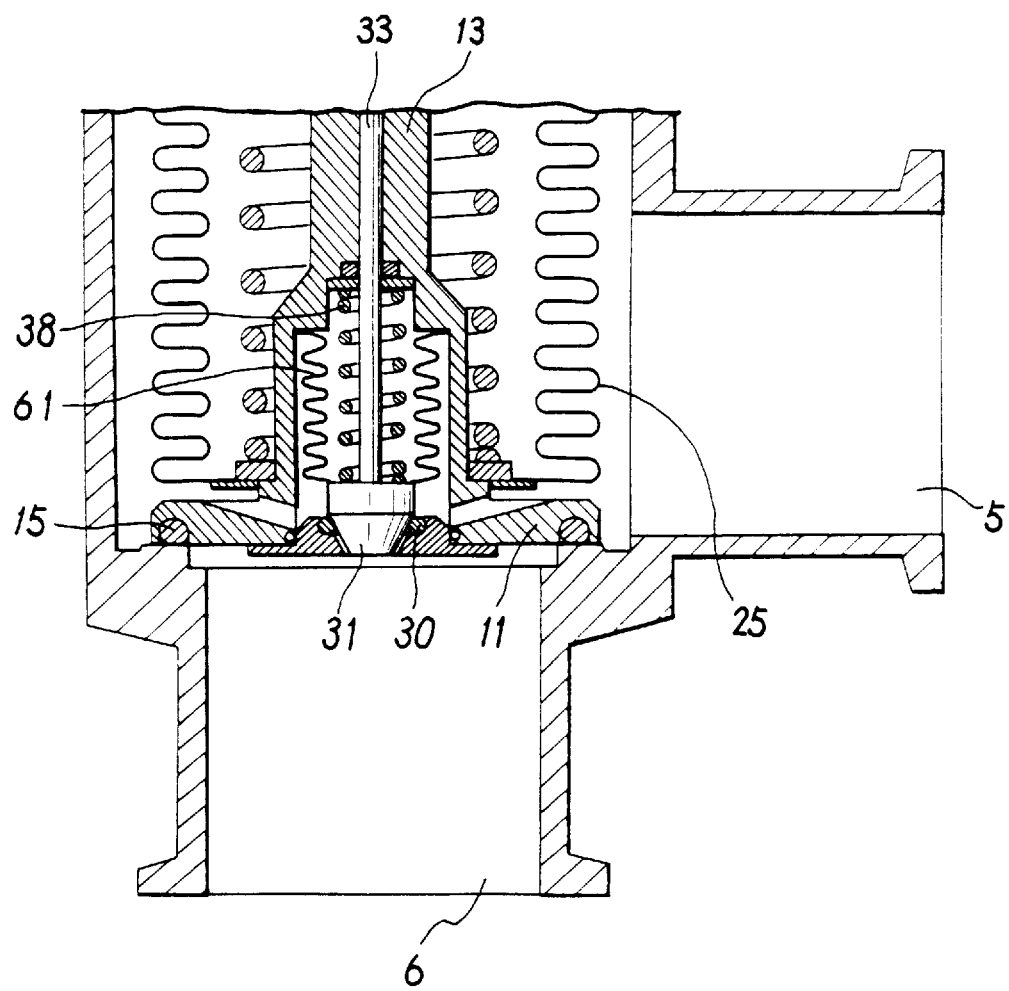
FIG. 4 is a cross sectional view of the integral part of a second embodiment of this invention.

Furthermore, although in the above embodiment, the seal member 37 consists of O-ring seals between the secondary valve body 31 and the primary shaft 13, a bellows 61 may be mounted between the secondary valve body 31 and the primary shaft 13 instead of the seal member 37, as shown in FIG. 4, in order to seal the vacuum pressure from the chamber port 5. In this case, the bellows 25 on the side of the primary valve body 11 may of course be omitted.

According to the slow exhaust valve of this invention, the secondary valve mechanism is incorporated inside the primary valve mechanism. Thus, the axial length of the valve body and the size of the valve can be reduced compared to conventional techniques wherein the primary and the secondary valve body drive members are linearly disposed and operated in different positions.

In addition, since the secondary valve mechanism can be installed simultaneously with the primary valve mechanism simply by installing the primary valve mechanism in the valve body, this invention provides a very simple valve structure and assembly, high assembly precision, and stable operations. The valve body need not be machined so as to accommodate the installation of the secondary valve mechanism, so it can be machined easily and commonly used in slow exhaust valves that do not have a secondary valve mechanism.

Furthermore, the relative locational relationship between the primary valve mechanism and the secondary valve mechanism is always constant, and the opening and closing stroke of the secondary valve body is not affected by the position of the primary valve mechanism. Thus, the secondary valve body can always maintain a constant distance from the secondary valve seat as well as a constant opening and closing stroke relative to the secondary valve seat, thereby preventing malfunctions.

In addition, the opening of the secondary valve mechanism may be adjusted easily by externally rotating the operation member.

What is claimed is:

1. A vacuum-pressure-control slow exhaust valve comprising a chamber port that is connected to a vacuum chamber, a pump port that is connected to a vacuum port, a primary valve mechanism that fully opens and closes a channel connecting both ports, and a secondary valve mechanism that restrictively opens and closes the channel connecting both ports, said primary valve mechanism having a primary valve seat disposed in the channel connecting both ports, a primary valve body that opens and closes the primary valve seat, a primary-valve-body drive member that uses fluid pressure to drive the primary valve body, and a primary shaft that connects said primary valve body and said primary-valve-body drive member, said secondary valve mechanism having a secondary valve seat having a smaller opening area than said primary valve seat, a secondary valve body that opens and closes the secondary valve seat, a secondary-valve-body drive member that uses fluid pressure to drive the secondary valve body, and a secondary shaft that connects said secondary valve body and said secondary-valve-body drive member together, wherein the secondary valve seat and said secondary valve body are incorporated in the primary valve body, wherein the secondary-valve-body drive member and a pressure-acting secondary chamber for allowing fluid pressure to act on the secondary-valve-body drive member are incorporated inside said primary-valve-body drive member and are not incorporated into said primary shaft, and wherein the secondary shaft penetrates the inside of the primary shaft.

2. A slow exhaust valve according to claim 1 wherein said pressure-acting secondary chamber and a secondary operation port that is opened in the valve body communicate with each other via a passage hole passing from the valve body through the primary shaft and opening into the pressure-acting secondary chamber.

3. A slow exhaust valve according to claim 1 or 2 wherein said secondary valve body is a needle valve.

4. A slow exhaust valve according to claim 1 or 2 including opening-adjustment means for enabling the external adjustment of the opening of the secondary valve mechanism.

5. A slow exhaust valve according to claim 4 wherein said opening-adjustment means has an adjustment screw that defines an opening stroke end of the secondary-valve-body drive member and an operation member for adjusting the position of the adjustment screw, wherein said adjustment screw is attached to the primary-valve-body drive member so as to move up and down when rotated, and wherein said operation member is mounted on said valve body in such a way that it can be externally rotated and is fitted to said adjustment screw in such manner that it engages the screw in the rotational direction while they can move relative to each other in the axial direction.

* * * * *